(12) United States Patent
Chang

(10) Patent No.: US 11,429,800 B2
(45) Date of Patent: Aug. 30, 2022

(54) OBJECT RECOGNITION SYSTEM AND RELATED DEVICE

(71) Applicant: HONG FU JIN PRECISION INDUSTRY (WuHan) CO., LTD., Wuhan (CN)

(72) Inventor: Chi-Yu Chang, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 0 days.

(21) Appl. No.: 17/266,126

(22) PCT Filed: May 13, 2020

(86) PCT No.: PCT/CN2020/090096
§ 371 (c)(1),
(2) Date: Feb. 5, 2021

(87) PCT Pub. No.: WO2021/226893
PCT Pub. Date: Nov. 18, 2021

(65) Prior Publication Data
US 2022/0114352 A1 Apr. 14, 2022

(51) Int. Cl.
*G06K 7/10* (2006.01)
*G06N 20/00* (2019.01)
(Continued)

(52) U.S. Cl.
CPC ......... *G06K 7/10297* (2013.01); *G06N 20/00* (2019.01); *G06V 10/764* (2022.01); *G06V 10/776* (2022.01); *G06V 20/20* (2022.01)

(58) Field of Classification Search
CPC .. G06K 7/10297; G06N 20/00; G06V 10/764; G06V 10/776; G06V 20/20
See application file for complete search history.

(56) References Cited

U.S. PATENT DOCUMENTS

2019/0332854 A1 10/2019 Rezaeilouyeh
2020/0342548 A1* 10/2020 Mazed ................... G06Q 50/01

FOREIGN PATENT DOCUMENTS

| CN | 107341538 A | 11/2017 |
|----|-------------|---------|
| CN | 108320404 A | 7/2018 |

(Continued)

OTHER PUBLICATIONS

H. Li, E. Whitmire, A. Mariakakis, V. Chan, A. P. Sample and S. N. Patel, "IDCam: Precise Item Identification for AR Enhanced Object Interactions," 2019 IEEE International Conference on RFID (RFID), 2019, pp. 1-7, doi: 10.1109/RFID.2019.8719279. (Year: 2019).*

(Continued)

*Primary Examiner* — Matthew Mikels
(74) *Attorney, Agent, or Firm* — ScienBiziP, P.C.

(57) ABSTRACT

An object recognition system is disclosed. The object recognition system includes an input device configured to obtain image data and a Radio Frequency Identification (RFID) data of an object, a processing device connected to the input device, and configured to perform a model training procedure, wherein the model training procedure includes capturing an object feature according to the image data, generating a classification data corresponding to the object according to the object feature, verifying a correctness of the classification data according to the RFID data, and generating a deep learning model according to the verified classification data, to regenerate the classification data, and an output device connected to the processing device, and configured to generate an object recognition data corresponding to the object according to the classification data generated by the deep learning model and the RFID data.

14 Claims, 11 Drawing Sheets

(51) Int. Cl.
*G06V 20/20* (2022.01)
*G06V 10/776* (2022.01)
*G06V 10/764* (2022.01)

(56) References Cited

FOREIGN PATENT DOCUMENTS

| CN | 109299748 A | 2/2019 |
| CN | 109615292 A | 4/2019 |
| CN | 109635705 A | 4/2019 |

OTHER PUBLICATIONS

X. Fan, F. Wang, F. Wang, W. Gong and J. Liu, "When RFID Meets Deep Learning: Exploring Cognitive Intelligence for Activity Identification," in IEEE Wireless Communications, vol. 26, No. 3, pp. 19-25, Jun. 2019, doi: 10.1109/MWC.2019.1800405. (Year: 2019).*

* cited by examiner

US 11,429,800 B2

OBJECT RECOGNITION SYSTEM AND RELATED DEVICE

FIELD

The present disclosure is generally related to an object recognition system, and more specifically, to an object recognition system for food delivery and logistics packages.

BACKGROUND

Food delivery and logistics are popular in the market in recent years, in spite of that they are in different outer packages, but they have the same goal of simplifying delivery process to shorten delivery time. Nowadays, E-commerce is more and more popular than physical stores, E-commerce is free from the limitation of time and distance; specifically, customers tend not to go shopping in a particular physical store during a period of time, while they prefer making an order by their mobile application (APP) and obtain the package of the order by a deliver-to-home service. Therefore, the logistics industry has to make adjustments to cater to customers' shopping preference. However, the current packet or food delivery still rely on a door-to-door signature for reception, In other words, the whole delivery process (including gathering, transportation, and picking-up the package to deliver to the designated address and customer) is required to be done by a human, and thus the need for deliveryman increases rapidly as the market of E-commerce grows up rapidly. However, it is possible that the package is delivered to a wrong address, or a food package is damaged or polluted due to human factors during the delivery process, which leads to return of goods to increase operating cost of a logistics company. In some cases, it is difficult to figure out the cause of food damage, stealing, and pollution. For example, the physical store has not provided enough amount of food, or some of food spills out during transportation, which leaves doubts about food safety.

The conventional logistics mechanism, in a case of package delivery process, the warehouse staffs pick up packages for a deliveryman and the deliveryman scans these packages to load to a truck for shipping. The deliveryman drives to a designated address, and then retrieves a designated package to the customer, to get a signature from the customer to complete the delivery process. In another case of food delivery process, a deliveryman accepts an order and rides a scooter to a designated restaurant to get the food package, places the food package into an insulation bag, rides to a designated address of a customer, delivers the food package to the customer, and gets a signature from the customer to finish the food delivery process.

In the current delivery process, it is difficult to clarify either the food provider or the deliveryman should be responsible for the mistake during the delivery process. In addition, there is no security mechanism for the food or package delivery process; in practice, the deliveryman may not be aware of a missing package when the staff carries too many packages. Further, there is no signature check mechanism for the deliveryman and the customer; in practice, when there are many orders corresponding to the same designated address, it is possible that the deliveryman may accidentally deliver a package to a wrong customer when both of them do not check delivery information of an order carefully. Therefore, there is a need to improve the conventional logistics mechanism.

SUMMARY

The present disclosure provides an object recognition system. The object recognition system includes an input device configured to obtain image data and a Radio Frequency Identification (RFID) data of an object, a processing device connected to the input device, and configured to perform a model training procedure, wherein the model training procedure comprises: capturing an object feature according to the image data, generating a classification data corresponding to the object according to the object feature, verifying a correctness of the classification data according to the RFID data, and generating a deep learning model according to the verified classification data, to regenerate the classification data, and an output device connected to the processing device, and configured to generate an object recognition data corresponding to the object according to the classification data generated by the deep learning model and the RFID data.

The present disclosure provides a fog device configured to perform object recognition. The fog device includes a processing unit configured to execute a program code, and a storage unit connected to the processing unit, and configured to store the program code, wherein the program code instructs the processing unit to execute the following steps: obtaining image data and a Radio Frequency Identification (RFID) data of an object, performing a model training program, wherein the model training program comprises the following steps: capturing an object feature according to the image data, generating a classification data corresponding to the object according to the object feature, verifying a correctness of the classification data according to the RFID data, and generate a deep learning model according to the verified classification data, to regenerate the classification data, and generate an object recognition data corresponding to the object according to the classification data generated by the deep learning model and the RFID data.

The present disclosure provides a mobile device. The mobile device includes a processing unit configured to execute a program code, and a storage unit connected to the processing unit, and configured to store the program code, wherein the program code instructs the processing unit to execute the following steps: obtain image data and a Radio Frequency Identification (RFID) data of an object, transmit the image data and the RFID data to a fog device configured to perform object recognition, receive an object recognition data and an augmented reality (AR) data corresponding to the object from the fog device, and generate an augmented reality image according to the object recognition data and the AR data corresponding to the object recognition data.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
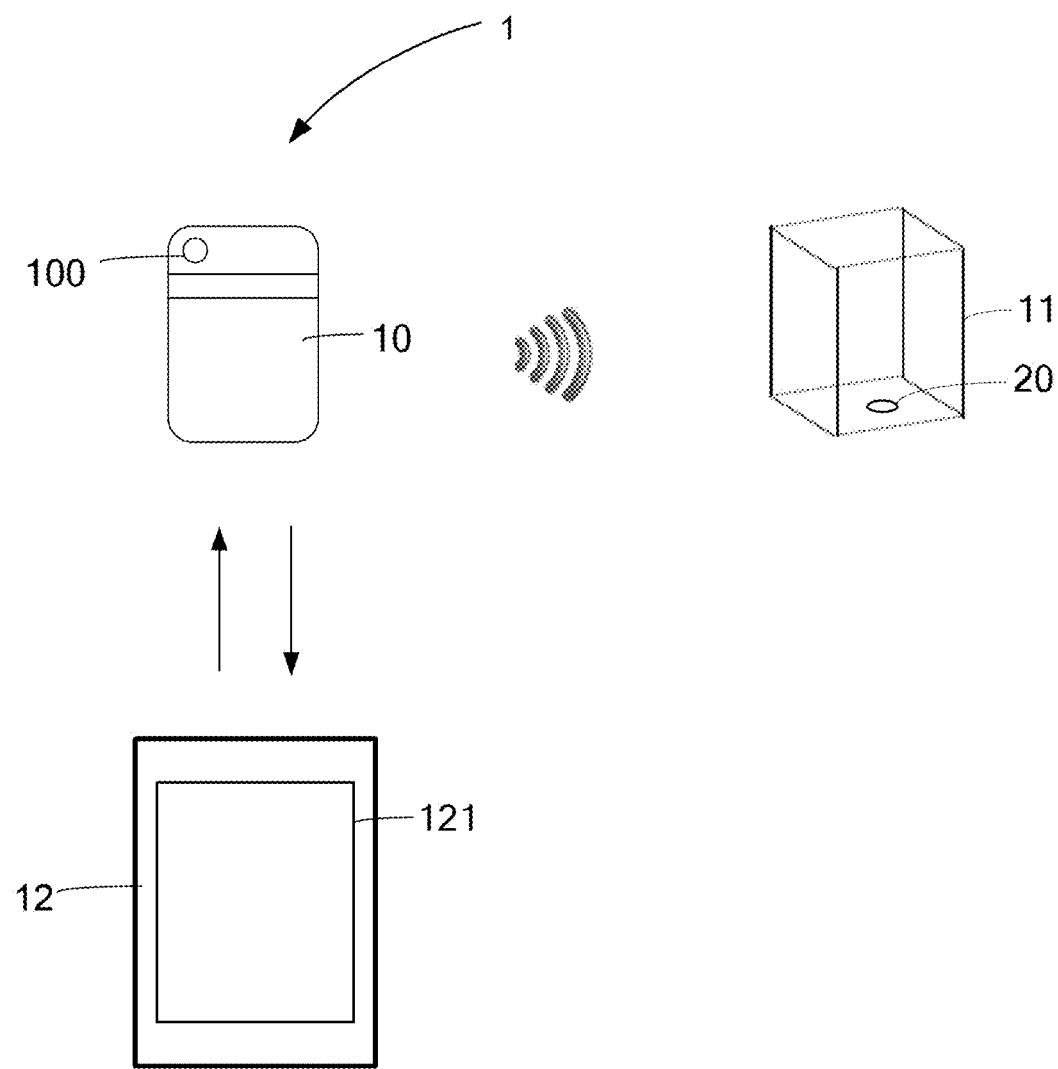
FIG. 1 is an architecture diagram of an object recognition system according to an embodiment of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

FIG. 1 is an architecture diagram of an object recognition system 1 according to an embodiment of the present disclosure. In short, the object recognition system 1 includes input device, output device and processing device, which respectively includes at least one processing unit and at least one storage unit. In FIG. 1, the input device is represented as the mobile device 10 (e.g., a mobile phone, a tablet compute, and the like). The object 11 may be a package containing goods or food, and the object 11 can be a box or any package with any shape, as long as the processing device 12 may identify at least one of a shape, a color, and a size of the object 11. Specifically, a user may use the camera 100 of the mobile device 10 to capture images of the object 11, and transmit the captured images to the processing device 12 to perform object recognition. The processing device 12 may generate a deep learning model by executing a classification operation and a model training operation, to recognize the object 11 precisely. It is noted that the processing device 12 of the present disclosure may apply Radio Frequency Identification (RFID) technology, such as Near-field communication (NFC) identification data (also known as NFC tag) as a parameter to perform the model training operation, which improves the performance of artificial intelligence (AI) deep learning. For example, a logistics staff may bring the mobile device 10 close to the object 11 to scan the RFID data (e.g., NFC tag) of the object 11, and transmit the RFID data to the processing device 12, and thus the processing device 12 may perform data verification operation according to RFID data. In addition, after the processing device 12 has finished object recognition for the object 11, the processing device 12 generates an object recognition data corresponding to the object 11, and transmits the object recognition data corresponding to the object 11 to the output device, so as to display the result of object recognition. In one embodiment, the output device could be the monitor 121 of the processing device 12, a displaying device integrated into the mobile device 10 or any devices with display functionality. The transmission between the mobile device 10, the object 11 and the processing device 12 may be realized by wired communication, wireless communication (e.g., WLAN, NFC, or Bluetooth technology), or any feasible communication technology.

Figure 2:
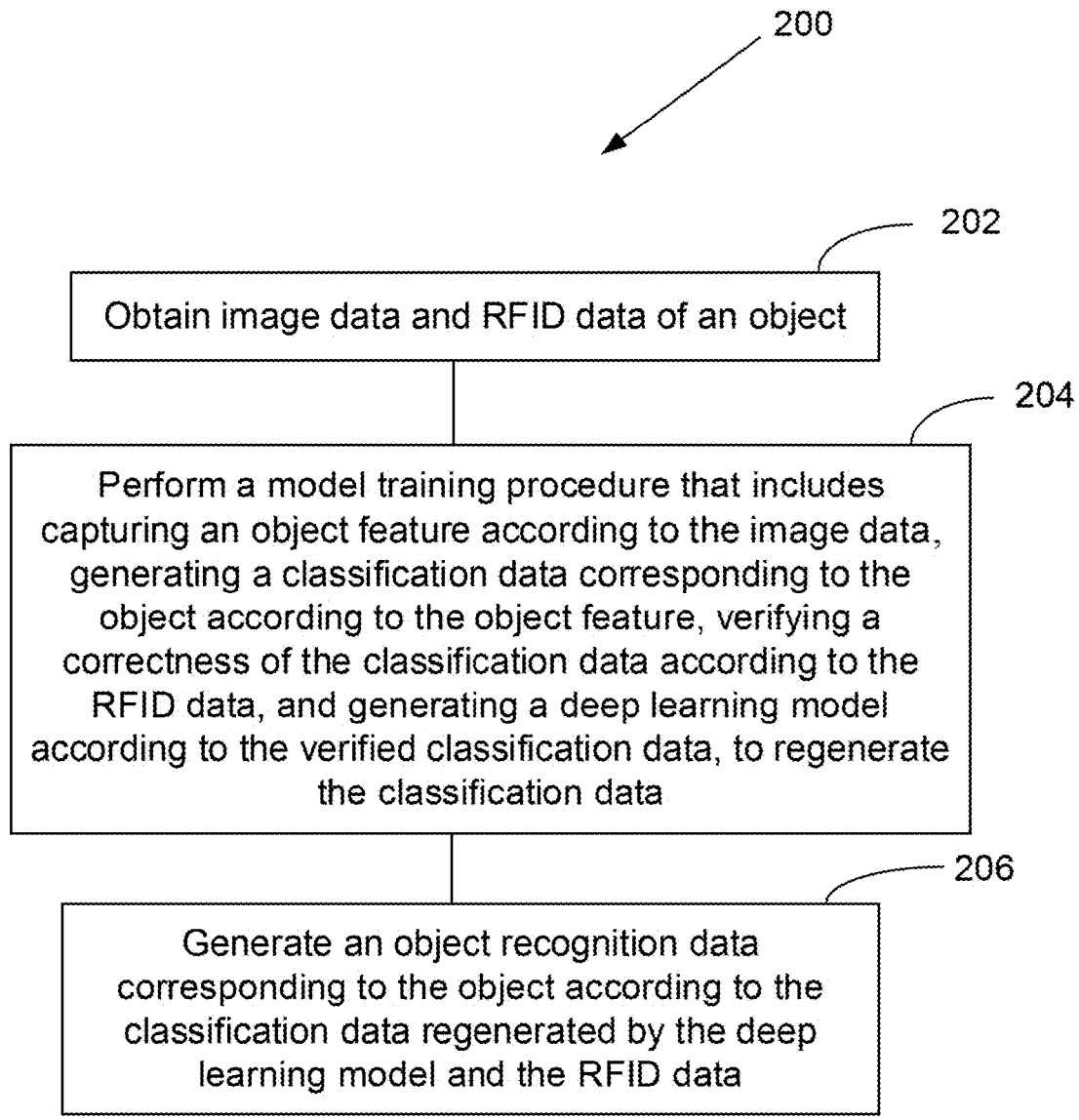
FIG. 2 is a flowchart illustrating operations of the object recognition system according to an embodiment of the present disclosure.

FIG. 2 is a flowchart illustrating operations of the object recognition system 1 according to an embodiment of the present disclosure. The process 200 illustrated in FIG. 2 may be compiled into a program code that is stored in the storage unit of the processing device 12 and instructs the processing unit of the processing device 12 to execute the following steps:

Step 202: Obtain image data and RFID data of an object.

Step 204: Perform a model training procedure that includes capturing an object feature according to the image data, generating classification data corresponding to the object according to the object feature, verifying the correctness of the classification data according to the RFID data, and generating a deep learning model according to the verified classification data, to regenerate the classification data.

Step 206: Generate an object recognition data corresponding to the object according to the classification data regenerated by the deep learning model and the RFID data.

According to the process 200, the processing device 12 performs AI model training procedure to generate the deep learning model according to the image data and the RFID data corresponding to the object 11, which improves the precision of the result of object recognition. Therefore, process 200 may assist a deliveryman to pick-up the right package, to improve delivery correctness and efficiency. The processing device 12 of the present disclosure may be implemented by a fog device to perform data processing with edge computation, and thus the computation for object recognition can be distributed to the user equipment. In other words, the user equipment may not transmit the raw image data and the RFID data to a cloud server, so that the cloud server does not need a greater processing capability to handle the computation of object recognition from the user equipment. With such manner, the user may experience less computation delay, the network bandwidth occupation for computation may be reduced, and the logistics operators may save cost by reducing the computation quantity of the cloud server.

Figure 3:
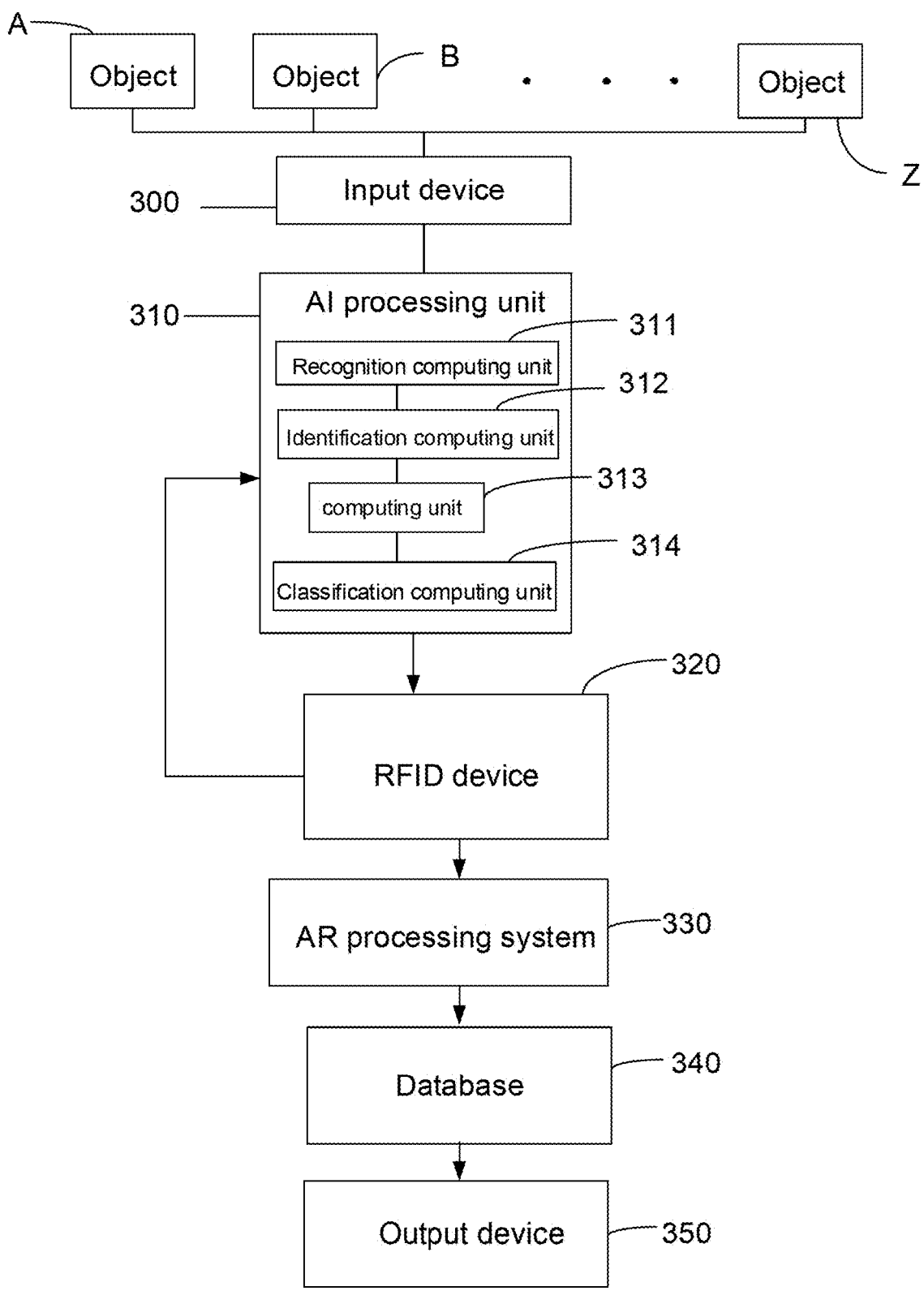
FIG. 3 is a flowchart illustrating operations of front-end logistics shipping according to an embodiment of the present disclosure.

The object recognition system 1 of the present disclosure utilizes AI data processing technology to realize the object recognition. In detail, the object recognition system 1 of the present disclosure utilizes the RFID data (e.g., NFC tag) as control data of AI deep learning for verification, which effectively improves the precision of the object recognition. Also, by continuously training the deep learning model for a sufficient period of time, the precision of the AI deep learning model could be improved gradually. The image data collected by the input device (e.g., the mobile device 10 of FIG. 1) is valuable for big data application, and can be reused to train a new AI deep learning model in the future. Therefore, the object recognition system 1 of the present disclosure can improve the precision of object recognition to break through the bottleneck for package classification and package picking-up in the logistics industry currently, so as to improve the efficiency for package delivery. FIG. 3 is a flowchart illustrating operations of front-end logistics shipping according to an embodiment of the present disclosure.

For example, FIG. 3 is a flowchart illustrating operations of front-end logistics shipping according to an embodiment of the present disclosure. Object A to object Z are packages on a shipping line in a logistics warehouse, and each of the objects A to Z has a unique shipping number. An AI processing unit 310 (which may be equivalent to the processing device 12 illustrated in FIG. 1) is configured to perform data analysis to distinguish the classification corresponding to the objects A to Z. The AI processing unit 310 may obtain raw images of the objects A to Z by the input device 300, and some of the raw images will be converted into at least one significant image to be stored in the AI processing unit 310. The AI processing unit 310 includes a plurality of computing units, and their functions are described as follows. The recognition computing unit 311 is configured to identify is there any object feature or only environment feature in an obtained image, to distinguish which image is significant, while no object feature is captured in the image, the image will not be processed by the following recognition computation. When the recognition computation unit 311 determines a significant image that includes an object feature, the AI processing unit 310 transmits the image data corresponding to the significant image to the identification computing unit 312. The identification computation unit 312 is configured to determine whether the object feature of the significant image is true or false according to an AI algorithm, which reduces a possibility of misjudgment for the significant image, to improve the precision of the object recognition system 1 of the present disclosure. Afterwards, the truly significant image is transmitted to the computing unit 313. The computing unit 313 is configured to compute an eigenvalue for the object feature to obtain a probability, where each node of the object feature corresponds to different kinds of feature, and thus the computing unit 313 may compute the probability of similarity according to the eigenvalue. Finally, the truly significant image is transmitted to the classification computing unit 314 to generate the classification data. The AI processing unit 310 may recognize the same object from multiple images to assign the same object in different images to the same class, multiple objects with a certain amount of similarity will be assigned to the same class, while any object that does not belong to any default classification will be assigned to an unknown classification, wherein the unknown classification may be recreated to a new classification when a new AI deep learning model is created. Applicant notices that data analysis and data mining for big data are future trends, and thus there is a need to gather and reserve any computed features and image data. The processed object classification data and the result of object recognition will be inputted to an RFID device 320, and specifically, an RFID chip integrated with the mobile device 10 may be configured to receive the RFID data corresponding to the object, and then the AI processing unit 310 verifies the result of classification of the object according to the RFID data corresponding to the object, to train the deep learning model with a certain amount of precession. Afterwards, the augmented reality (AR) processing system 330 is configured to generate AR display data, thereby the object recognition data (e.g., object detail, delivery history, object name, logistics order, and so on) can be displayed in an AR environment. The object classification data and the RFID data will be transmitted to and stored in the database 340 as a record that can be reused in the future. Finally, the object recognition data and the AR display data (e.g., delivery history, object name and logistics order as mentioned above) will be transmitted to the output device 350 (e.g., the mobile device 10 in FIG. 1) to display the object recognition data in the AR environment.

Simply speaking, the object recognition system 1 of the present disclosure uses at least two parameters (i.e., the object classification data and the RFID data) to double check the correctness of the result of object recognition, to reduce the uncertainty due to human's recognition and improve customer's satisfaction, which makes a win-win result for both the customer and the logistics company. With the rapid development of neural network algorithms in recent years, AI can be said to have evolved rapidly. Machine learning is a very important part of AI. It can be divided into two parts: training and prediction. Training can make machines learn objects like humans, where the learning process improves the correctness of recognition, so that the accuracy for object recognition continues to rise and maintain a certain correctness. The prediction part is performed after the machine training, an object can be actively predicted without assistance and correction. The types of machine learning include supervised learning, unsupervised learning and semi-supervised learning, where supervised learning provides standard results of object recognition, to determine a deviation of object recognition in machine learning, and thus improve the accuracy of predictions. supervised learning involves actions of labeling the data, and retrieve features from the inputted data for predictions (e.g., recognizing object or determining result). This process is similar to human classification. It is easier for machines but requires more preparation for humans. Unsupervised learning provides no standard result of object recognition, so the machine performs object recognition without determining a deviation of the object recognition. Thus, the prediction is often less accurate, but can reduce the burden of data collection. This process is suitable for complex classification and difficult data sets. Semi-supervised learning may provide some standard results of object recognition for machine learning references, but most of object recognitions have no standard result, which is equivalent to combining the advantages of supervised learning and unsupervised learning. This process requires few human classifications, but at the same time, it can improve the accuracy of some predictions, so it is more commonly used at present.

For example, the present disclosure utilizes supervised learning for machine learning, specifically, the RFID data is used to verify the correctness (or deviation) of the object classification from the AI processing unit 310, to iteratively train the deep learning model, to improve the precision of the object recognition.

After the deep learning model has been established, when a logistics staff uses the object recognition system 1 of the present disclosure to recognize an object, the camera 100 of the mobile device 10 may capture images of at least one object at any locations; moreover, the object recognition system 1 is capable of performing object recognition and cross comparison to multiple objects simultaneously when there are multiple objects in one image, to improve the efficiency of object recognition for the subsequent package delivery. In addition, after the object recognition is finished, object recognition data may be displayed in an AR environment, which helps a logistics staff to read the object with an item name, related object information and delivery information, which is not limited.

In an operation of AR, a transportation driver or a deliveryman may use a camera of his or her mobile phone to obtain images, and transmit the images to an AI processing device capable of edge computation. The processing device may perform pre-processing for each of the mages, where the pre-processing may involve background elimination, de-noise, and the like. Then, the AI processing device performs spatial analysis to determine spatial coordinates corresponding to nodes of the object in the inputted image. After the classification data and object recognition data corresponding to the object are determined, the spatial coordinates are stored for further object recognition, to gradually improve the precision of object recognition.

In an example, the object classification data, the object recognition data, and the AR data may be merged into the same data file. Therefore, the object recognition system 1 may effectively assist the deliveryman to deliver a massive number of packages for goods and food quickly and correctly, to realize an AI logistics system for delivering goods or food to consumers to ensure food safety and reduce the error rate of logistics. As a result, with the object recognition system 1 of the present disclosure, after the deep learning model and the logistics database (e.g., the classification data, the image data and the AR data, and the like) have been established in the AI processing device, the deliveryman may use the mobile device to transmit the image to the AI processing device for object recognition; in this case, the deliveryman does not have to scan NFC tags of all objects for searching a target object.

Figure 4:
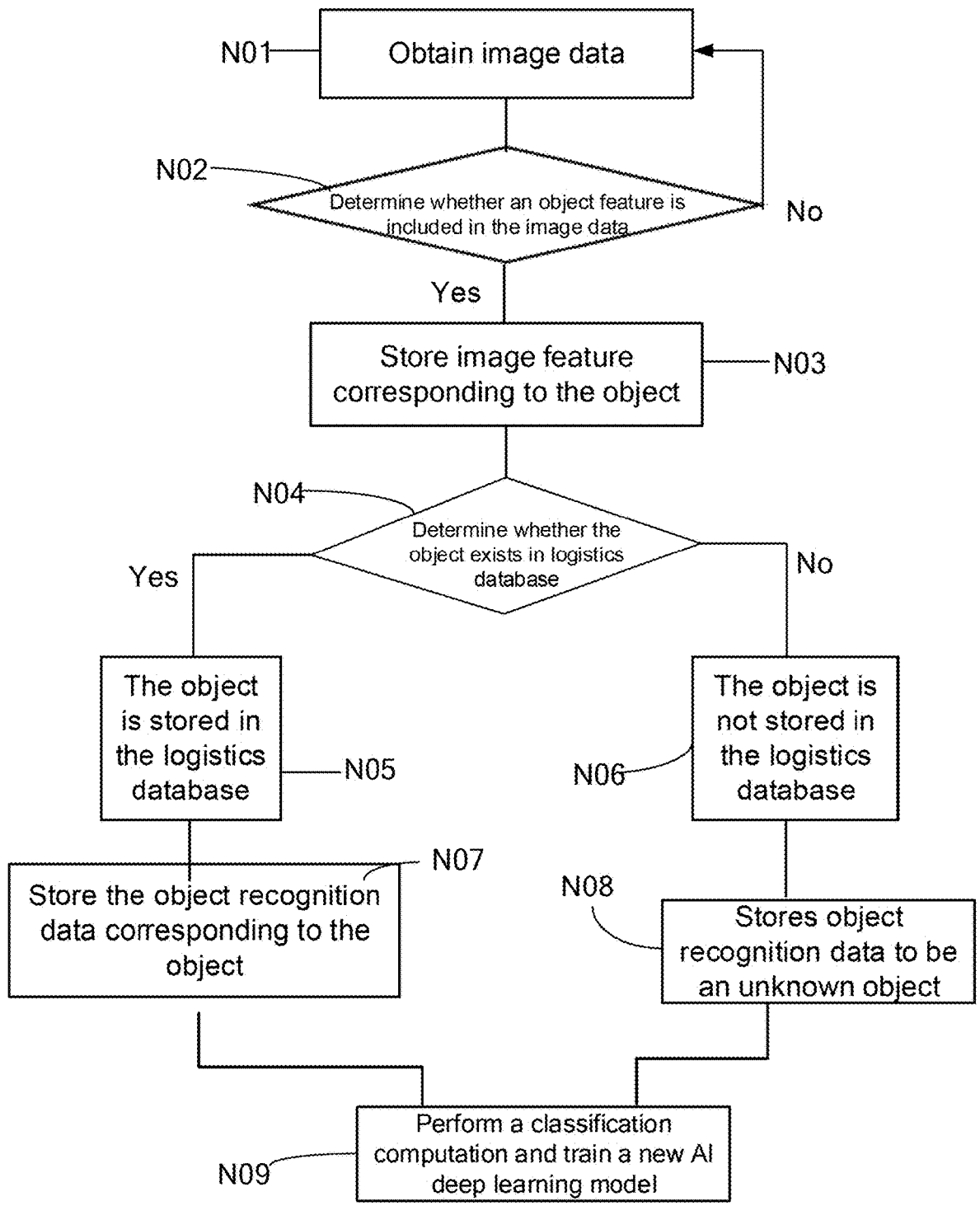
FIG. 4 is a flowchart illustrating operations of artificial intelligence (AI) object recognition according to an embodiment of the present disclosure.

FIG. 4 is a flowchart illustrating operations of AI object recognition according to an embodiment of the present disclosure. As illustrated in FIG. 4, the object recognition system 1 of the present disclosure may use an input device to obtain image data (step N01), and then the input device transmits the image data to a processing device to determine whether there is any object feature in the image data (step N02). On the other hand, when there is no object feature in the image data, the input device obtains another image data (e.g., return to step N01). Once an object is recognized, the processing device stores the image feature corresponding to the object (step N03), where the image feature may be utilized for the following deep learning processing. After the image feature is stored, the processing device determines whether the object exists in the logistics database (step N04). In an example, there are various algorithms for object recognition according to the image feature, those skilled in the art may choose any feasible algorithms for object recognition, which is not limited in the present disclosure, as long as the correctness of the following object recognition can be improved. When the processing device determines that the object is stored in the logistics database (step N05), the processing device performs the object recognition and stores the object recognition data corresponding to the object (step N07). On the other hand, when the processing device determines that the object is not stored in the logistics database (step N06), the processing device stores object recognition data to be an unknown object (step N08). Finally, the processing device performs a classification computation and trains a new AI deep learning model according to the object recognition data corresponding to the object and the unknown object (step N09), to improve the correctness of object recognition.

Moreover, the object recognition system 1 of the present disclosure stores and updates object recognition data, to improve the precision of AI object recognition, and the object recognition data and the AR display data are merged into the same file to store in the logistics database, so as to realize object recognition for one or more objects simultaneously.

Figure 5:
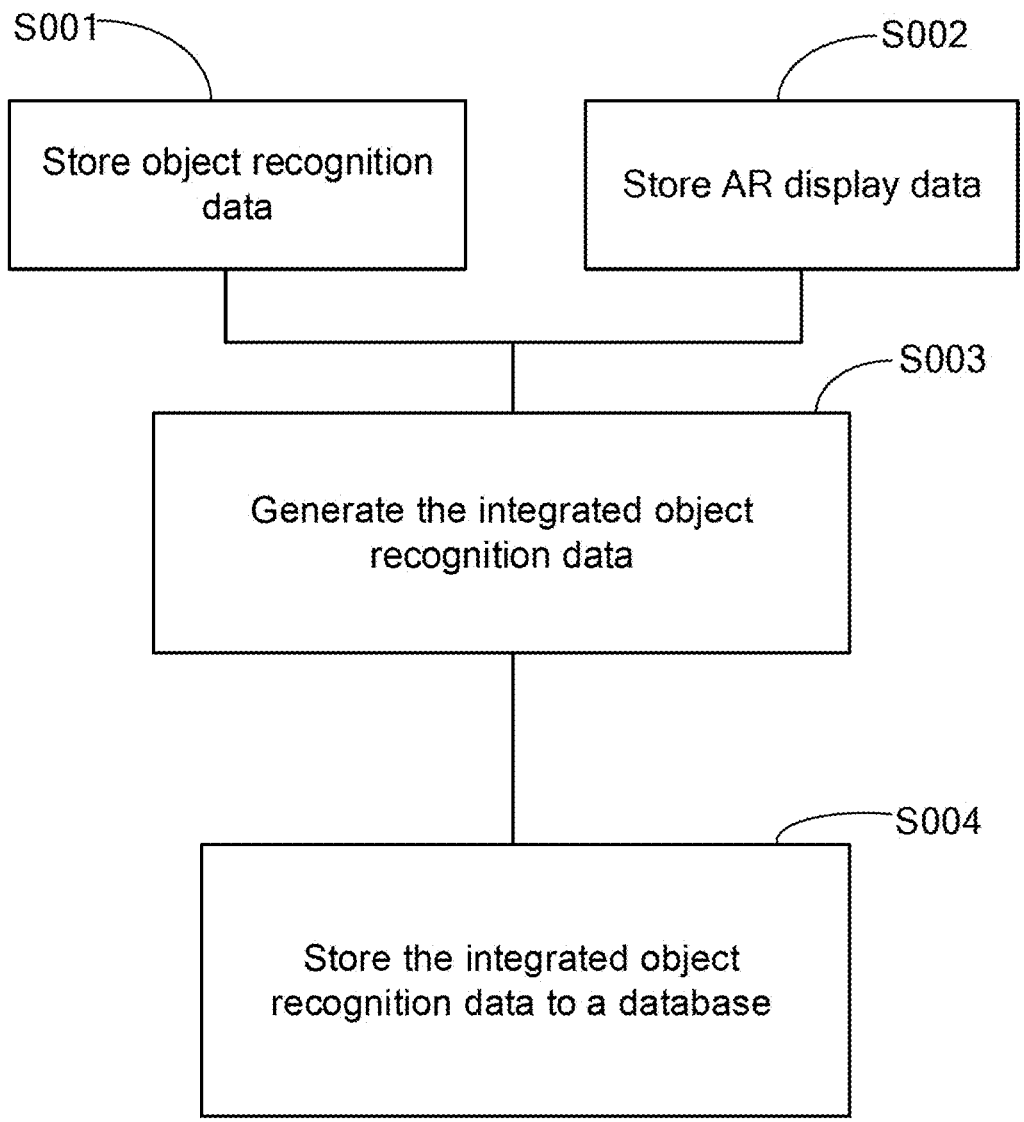
FIG. 5 is a schematic diagram illustrating an object recognition system implemented by the augmented reality (AR) technology according to an embodiment of the present disclosure.

FIG. 5 is a schematic diagram illustrating an object recognition system implemented by AR technology according to an embodiment of the present disclosure. As illustrated in FIG. 5, in order to establish a database for object recognition data and AR display data, the processing device integrates the stored object recognition data (e.g., action S001) with the AR display data (e.g., action S002), to generate the integrated object recognition data (e.g., action S003). Finally, the processing device stores the integrated object recognition data to a database (e.g., action S004), where the integrated object recognition data may be used to establish a feature model (e.g., the various algorithms mentioned above based on the object feature), and the integrated object recognition data may be used to train a new AI deep learning model as well. The processing device may access the database directly to reduce computation time for object recognition.

In order to avoid the delivered food from pollution and safety, the present disclosure further provides an embodiment which uses a two-dimensional barcode (e.g., QR code) as a lock for the deliverymen (e.g., they are not well trained and non-contracted employee). Therefore, the AI logistics system (i.e., the object recognition system 1) may reduce the possibility of wrong delivery.

Figure 6:
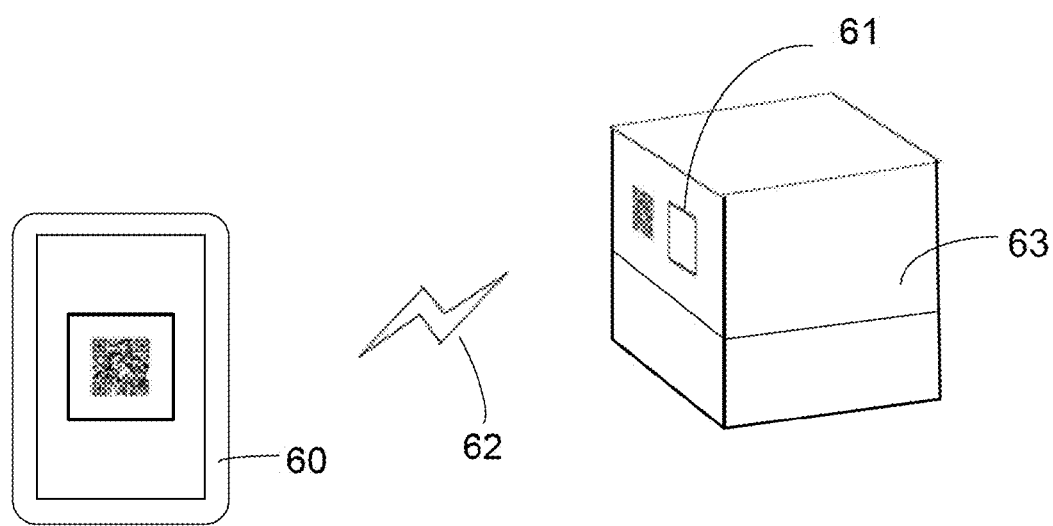
FIG. 6 is a schematic diagram illustrating operations of smart lock application according to an embodiment of the present disclosure.

FIG. 6 is a schematic diagram illustrating operations of smart lock application according to an embodiment of the present disclosure. The box 63 may be a container for containing and protecting a delivery good or food from being damaged, the shape and material of the box 63 are not limited, for example, the shape of the box 63 may be a cuboid, a sphere, a handbag, a back bag, and so on. There is a smart lock 61 disposed on the box 63. In one embodiment, the smart lock 61 may be realized by a two-dimensional barcode. The two-dimensional barcode may correspond to a serial number configured for the smart lock 61, the deliveryman may use a mobile device 60 to scan the two-dimensional barcode to obtain unlock information and the mobile device 60 transmits the signal 62 to the smart lock 61 to unlock it, where the two-dimensional barcode may be transmitted by wired communication, wireless communication (e.g., WLAN, Bluetooth, NFC, and the like). In one embodiment, the smart lock 61 may be an electronic seal or any feasible security devices, those skilled may choose any kind of lock according to practical requirement in order to adapt to the design of the box 63, which is not limited.

Figure 7:
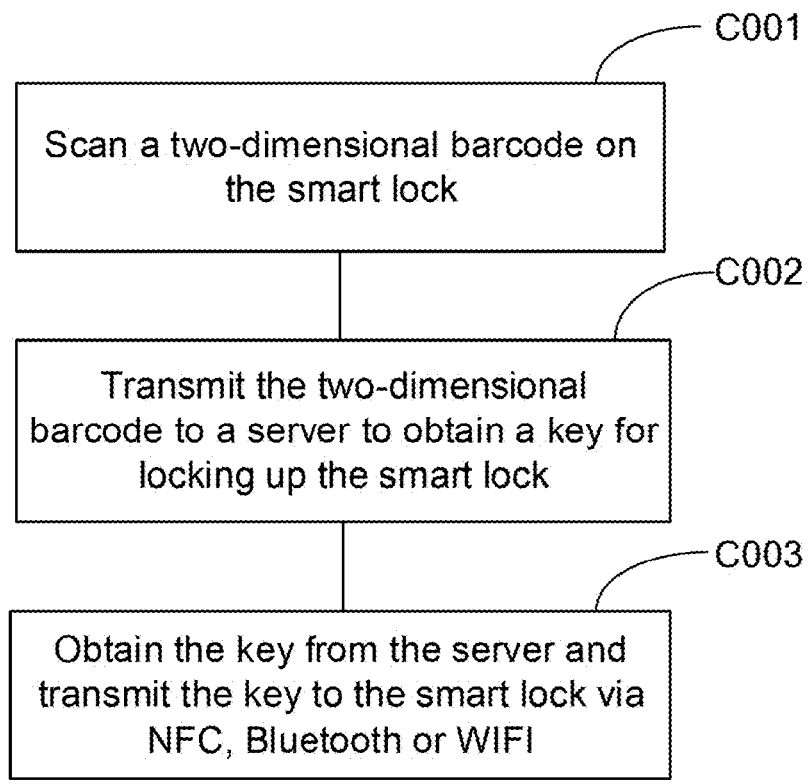
FIG. 7 is a flowchart illustrating operations of locking up the smart lock according to an embodiment of the present disclosure.

FIG. 7 is a flowchart illustrating operations of locking up the smart lock according to an embodiment of the present disclosure. When shipping from a shopping store or a logistics company, in particular food, packages, a lock is required to ensure the security of the package. In an example, the lock should be lock-up via a mobile device from the shopping store or the logistics company instead of the mobile device of the deliveryman. As illustrated in FIG. 7, an employee of the logistics company may use his or her mobile device to scan a two-dimensional barcode on the smart lock (e.g., the smart lock 61 in FIG. 6) (step C001), and transmit the two-dimensional barcode to a server of the logistics company in order to obtain a key for locking up the smart lock (step C002). The server then transmits the key to the smart lock, thereby the smart lock is locked up (step C003). Note that, the signal transmission between the mobile device and the smart lock may be realized by wired communication or wired communication, wireless communication (e.g., WLAN, NFC, or Bluetooth technology), or any feasible communication technology.

Figure 8:
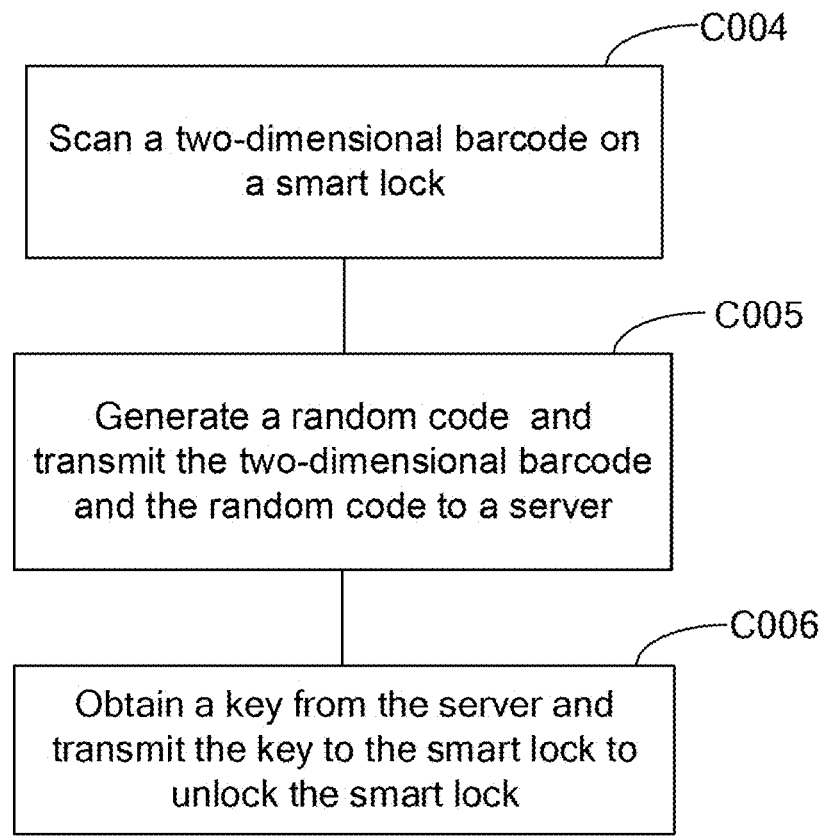
FIG. 8 is a flowchart illustrating operations of unlocking the smart lock according to an embodiment of the present disclosure.

FIG. 8 is a flowchart illustrating operations of unlocking the smart lock according to an embodiment of the present disclosure. When a good or food package is delivered to a customer, the customer may use his or her mobile device to scan a two-dimensional barcode on the smart lock once a software application having a self-pickup function is enabled by the customer (step C004). After the mobile device of the customer has obtained the two-dimensional barcode, the software application automatically uploads a random code of good or food order and the two-dimensional barcode to a server of the shopping store or the logistics company, so that the server transmits a key to the mobile device of the customer according to the random code and the two-dimensional barcode (step C005). Then, the mobile device of the customer transmits the key to the smart lock to unlock it (step C006). Note that, the signal transmission between the mobile device of the customer and the server of the shopping store or the logistics company may be realized by wireless communication (e.g., WLAN, NFC, or Bluetooth technology), or any feasible communication technology. In this case, the mobile device of the customer must have the function of wireless communication.

Figure 9:
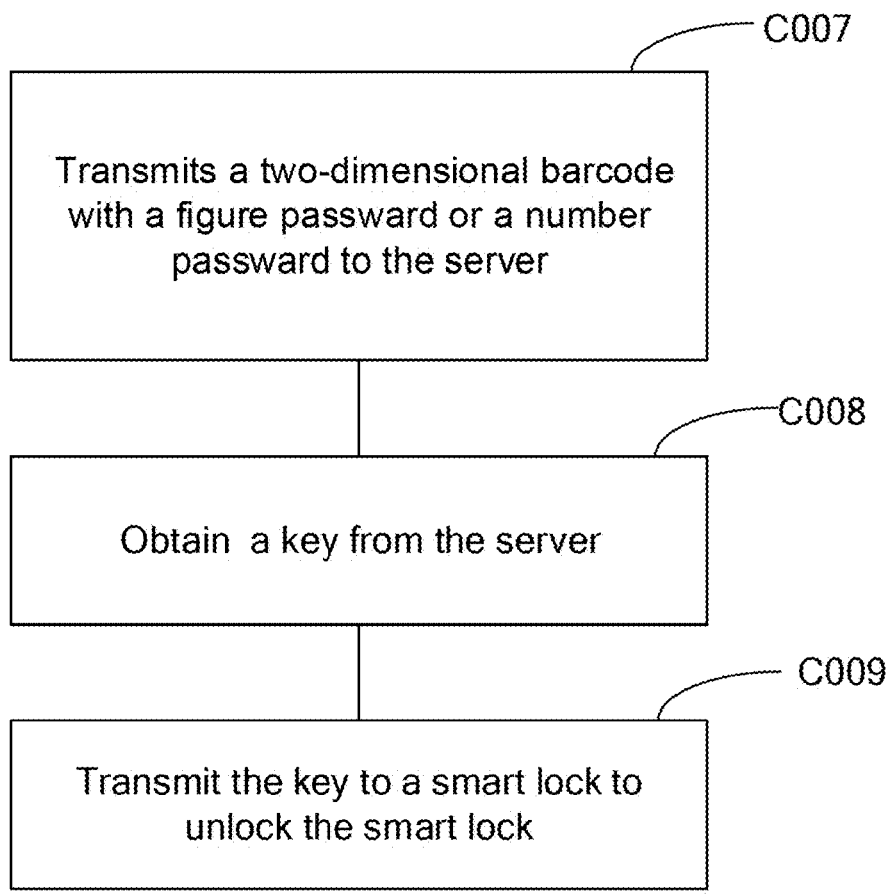
FIG. 9 is a flowchart illustrating operations of unlocking the smart lock according to an embodiment of the present disclosure.

In another case, when the mobile device of the customer does not have the function of wireless communication, or the customer does not carry his or her mobile device, the present disclosure further provides a backup plan for unlocking the smart lock, which ensures that the good or food package can be unlocked under any condition. FIG. 9 is a flowchart illustrating operations of unlocking the smart lock according to an embodiment of the present disclosure. A deliveryman usually carries his or her mobile device on duty to accept an order and track shipping status corresponding to the accepted order, and the logistics company may communicate with the deliveryman through his or her mobile device for resource management. In this example, the mobile device of the deliveryman may install a software application having a customer-pickup function. Once the customer-pickup function is enabled, the mobile device of the deliveryman displays a password input interface, and the customer is required to input a figure password or a number password that is determined and stored in the server of the logistics company when the customer is making the order. Then, the mobile device of the deliveryman transmits the figure password or the number password to the server of the logistics company (step C007). The server of the logistics company transmits a key in response to the figure password or the number password to the mobile device of the deliveryman (step C008). Then, the mobile device of the deliveryman transmits the key to the smart lock to unlock it (step C009). In the embodiments of FIG. 8 and FIG. 9, the smart lock is utilized to ensure the good or food package is firmly sealed through the whole delivery process until the customer has received the good or food package.

There is no smart lock on the conventional box for good or food delivery. In the present disclosure, a box of good or food delivery (which is not limited to box, bag, and the like) may be modified to add the smart lock on it, in order to improve package security.

Figure 10:
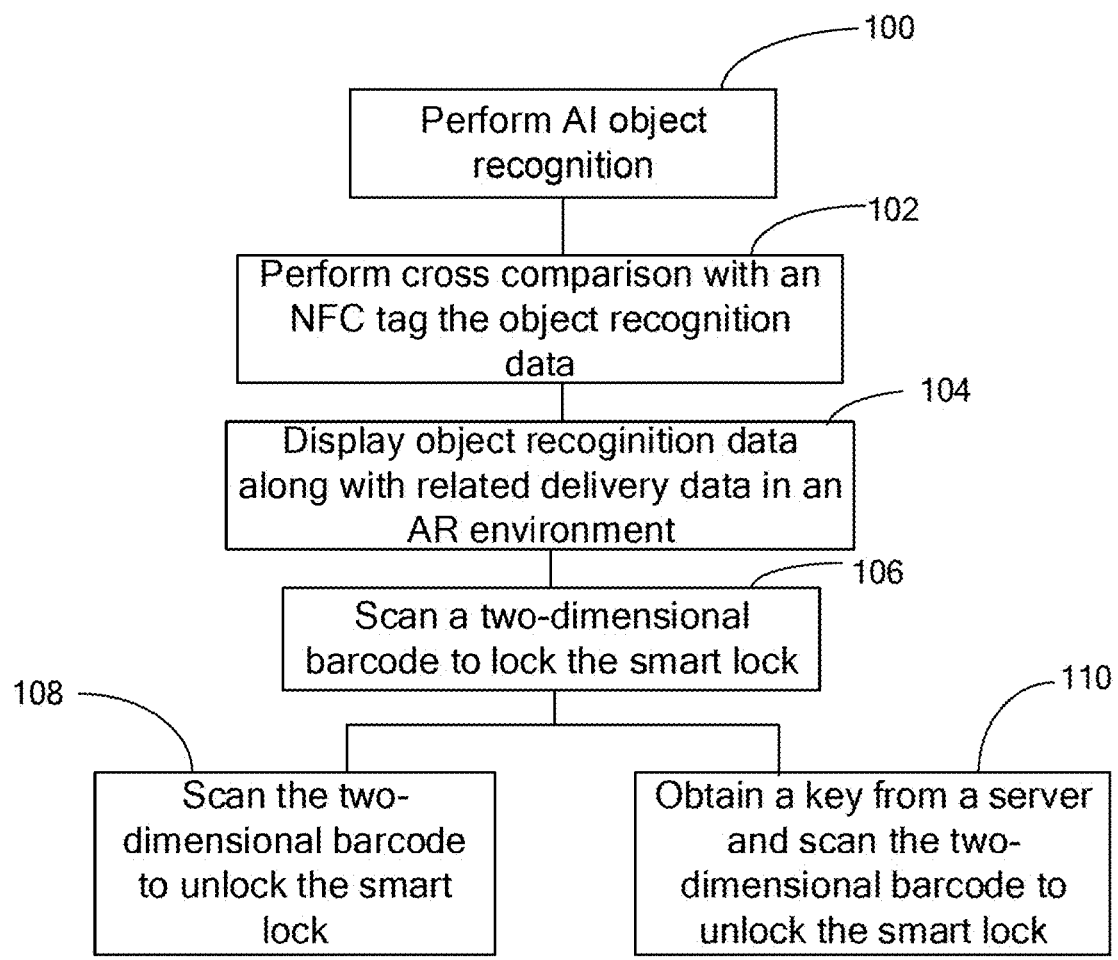
FIG. 10 is a flowchart illustrating operations of artificial intelligence (AI) logistics system according to an embodiment of the present disclosure.

FIG. 10 is a flowchart illustrating operations of an AI logistics system according to an embodiment of the present disclosure. As illustrated in FIG. 10, a processing device (e.g., the processing device 12 in FIG. 1) performs AI object recognition (step 100) to instantly obtain object recognition data. Further, the processing device performs a cross comparison with an NFC tag and the object recognition data, to train an AI deep learning model iteratively, in order to improve the correctness of object recognition (step 102). The object recognition data may be displayed along with related delivery data in an AR environment to make it looked realistically, (step 104), such display methodology is different from the prior art. Noticeably, displaying the object recognition data and the related delivery data in the AR environment may assist the deliveryman to search a designated package efficiently from a pile of packages in a good truck or a food bag. Finally, the mechanism of using the two-dimensional barcode to lock and unlock a smart lock may ensure the good or food package is firmly sealed through the whole delivery process until the customer has received the good or food package (step 106-110).

Conventional AI object recognition computation is processed by a cloud server, while the AI object recognition computation in the present disclosure is handled by a fog device according to an edge algorithm. A deliveryman may use his or her mobile device to obtain and transmit images of at least one package to the fog device to perform the AI object recognition computation according to the edge algorithm, so as to automatically recognize object features. In practice, it may be difficult for the deliveryman to distinguish a designated package from a pile of packages, the AI object recognition performed by the fog device may select several packages corresponding to the same classification, and the deliveryman may scan the NFC tags corresponding to the selected packages to pick up the designated package correctly and efficiently. From another point of view, the AI object recognition computation with a certain amount of precision may reduce the number of scanning NFC tags when the deliveryman is searching for the designated package from a pile of packages. In addition, before package shipping, the deliveryman or a food provider may capture images of each of the packages and transmit the image data to the fog device for AI object recognition computation, the object recognition data and the related delivery data are combined with the AR display data, so as to reduce the possibility of wrong delivery. Further, the employee of the logistics company or the food provider may obtain a two-dimensional barcode configured to lock a smart lock on the corresponding package. The deliveryman has no right to unlock the smart lock. However, the deliveryman may obtain authorization from a customer center under special situations. Under normal situations, either the customer uses his or her mobile device to scan the two-dimensional barcode to obtain a key for unlocking the smart lock, or the customer inputs the password to the mobile device of the deliveryman to obtain the key for unlocking the smart lock, which ensures the good or food package is firmly sealed through the whole delivery process until the customer has received the good or food package.

Figure 11:
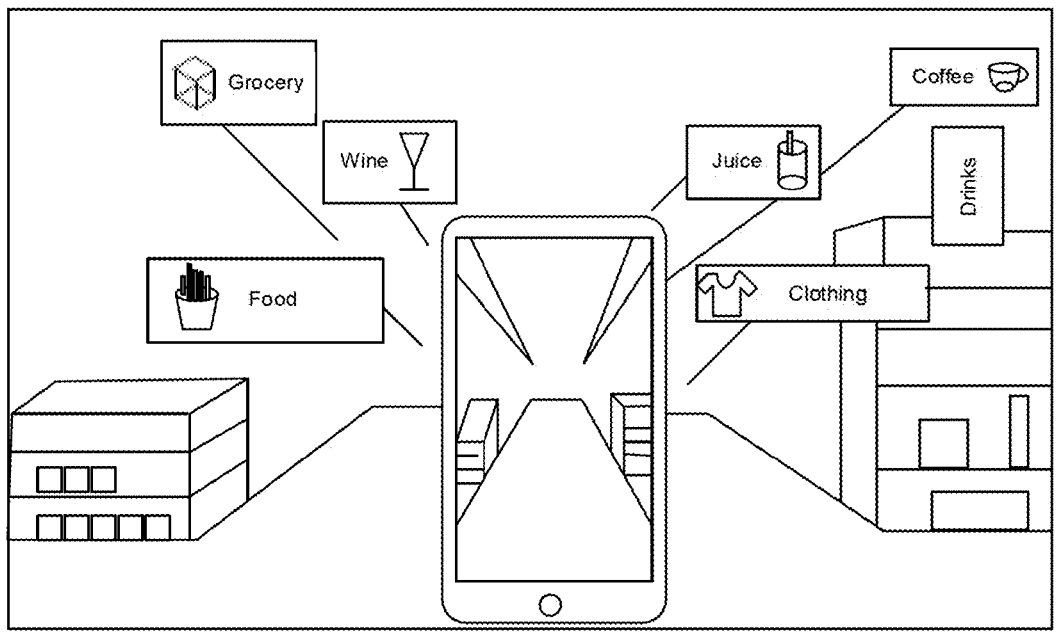
FIG. 11 is a schematic diagram illustrating an object recognition system implemented by an AR display imaging according to an embodiment of the present disclosure.

FIG. 11 is a schematic diagram illustrating an object recognition system implemented by an AR display imaging according to an embodiment of the present disclosure. The mobile device (e.g., the mobile device 10 in FIG. 1) of the deliveryman of present disclosure displays the object recognition data and the related deliver data in the AR environment (e.g., Video See-through) to make it more informative. With such manner, the user can interact with the AR environment in real time, without special reaction time or post-production time, where the displayed information is about one or more objects. At present, most interactive technology can only be used by a single product or for personal use. It is possible to be solved by displaying the object recognition data and the related deliver data in the AR environment. That is, if the object recognition system is used on a truck or warehouse, the deliveryman can scan and recognize a large number of objects at the same time with the displaying method disclosed in the present disclosure, so it can help the deliveryman quickly find the items to be delivered to avoid manual item picking errors. As illustrated in FIG. 11, the object recognition data displayed in the AR environment includes an item name and an item pattern, which helps a truck driver or a deliveryman to effectively find out the designated package.

In summary, designing an AI logistics system is a popular topic in the logistics industry, the present disclosure firstly recognizes object features from the captured images to perform classification to at least one package. The classification data generated from the object recognition process and the RFID are used to train an AI deep learning model and improve the correctness of object recognition by iteratively model training in order to avoid manual mistakes. Before shipping a package, a deliveryman may scan an RFID corresponding to the package to obtain its delivery route, verify whether the package is ready for shipping, and report a shipping record to the AI logistics system. The present disclosure further utilizes AR technology to display good delivery information, which helps the deliveryman to pick up the designated package efficiently. In addition, the deliveryman may scan a two-dimensional barcode to lock the smart lock on the package, and the smart lock can be unlocked only when the customer has received and signed for the package, which ensures the good or food package is firmly sealed through the whole delivery process until the customer has received the good or food package.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. An object recognition system, comprising:
    an input device configured to obtain image data, a Radio Frequency Identification (RFID) data of an object and a two-dimensional barcode on the object;
    a processing device connected to the input device, and configured to perform a model training procedure and generate a key configured to lock or unlock a smart lock on the object according to the two-dimensional barcode, wherein the model training procedure comprises:
        capturing an object feature according to the image data;
        generating a classification data corresponding to the object according to the object feature;
        verifying a correctness of the classification data according to the RFID data; and
        generating a deep learning model according to the verified classification data, to regenerate the classification data; and
    an output device connected to the processing device, and configured to generate an object recognition data corresponding to the object according to the classification data generated by the deep learning model and the RFID data, and receive the key configured to lock or unlock the smart lock.

2. The object recognition system of claim 1, wherein the output device is further configured to display the object recognition data with an augmented reality (AR) application program.

3. The object recognition system of claim 2, further comprising a storage device connected to the output device, and configured to store at least one of an augmented reality (AR) data, the object recognition data, the image data, the RFID data, the classification data, and the object feature.

4. The object recognition system of claim 3, wherein the processing device comprises at least one of a cloud server and a fog server, and the storage device comprises at least one of a cloud database and a fog database.

5. The object recognition system of claim 3, wherein the processing device is further configured to:
    determine whether the object recognition data corresponding to the object is stored in the storage device;
    perform the model training procedure when the processing device determines that the object recognition data corresponding to the object is not stored in the storage device; and
    obtain the object recognition data from the storage device when the processing device determines that the object recognition data corresponding to the object is stored in the storage device.

6. The object recognition system of claim 1, wherein the object recognition data comprises at least one of an object name, a delivery data and a logistics order.

7. The object recognition system of claim 1, wherein the input device is further configured to obtain a two-dimensional barcode on the object and generate a random code, the processing device is further configured to generate a key configured to lock or unlock a smart lock on the object according to the random code and the two-dimensional barcode, and the output device is further configured to receive the key configured to lock or unlock the smart lock.

8. The object recognition system of claim 1, wherein the RFID data comprises an NFC (Near-field communication) identification data.

9. A fog device configured to perform object recognition, and comprising:
    a processing unit configured to execute a program code; and
    a storage unit connected to the processing unit, and configured to store the program code;
    wherein the program code instructs the processing unit to execute the following steps:
        obtaining image data and a Radio Frequency Identification (RFID) data of an object;
        performing a model training program, wherein the model training program comprises the following steps:
            capturing an object feature according to the image data;
            generating a classification data corresponding to the object according to the object feature;
            verifying a correctness of the classification data according to the RFID data; and
            generating a deep learning model according to the verified classification data, to regenerate the classification data; and generating an object recognition data corresponding to the object according to the classification data generated by the deep learning model and the RFID data, wherein the program code further instructs the processing unit to execute the following steps:

receiving a two-dimensional barcode corresponding to the object from a mobile device;

generating a key according to the two-dimensional barcode, wherein the key is configured to lock or unlock a smart lock on the object and transmitting the key to the mobile device.

10. The fog device of claim 9, wherein the storage unit is further configured to store an augmented reality (AR) data corresponding to the object recognition data, and the program code further instructs the processing unit to execute the following step:

generate an AR image according to the object recognition data and the AR data corresponding to the object recognition data.

11. The fog device of claim 9, wherein the storage unit is further configured to store the object recognition data, and the program code further instructs the processing unit to execute the following steps:

determine whether the object recognition data corresponding to the object is stored in the storage unit;

perform the model training program when the object recognition data corresponding to the object is not stored in the storage unit; and obtain the object recognition data from the storage unit when the object recognition data corresponding to the object is stored in the storage unit.

12. The fog device of claim 9, wherein the program code further instructs the processing unit to execute the following steps:

receive a two-dimensional barcode and a random code corresponding to the object from a mobile device;

generate a key according to the two-dimensional barcode and the random code, wherein the key is used to lock or unlock a smart lock on the object; and transmit the key to the mobile device.

13. A mobile device, comprising:

a processing unit configured to execute a program code; and a storage unit connected to the processing unit, and configured to store the program code;

wherein the program code instructs the processing unit to execute the following steps:

obtaining image data and a Radio Frequency Identification (RFID) data of an object;

transmitting the image data and the RFID data to a fog device configured to perform object recognition;

receiving an object recognition data and an augmented reality (AR) data corresponding to the object from the fog device; and generating an augmented reality image according to the object recognition data and the AR data corresponding to the object recognition data, wherein the program code further instructs the processing unit execute the following step:

obtaining a two-dimensional barcode corresponding to the object;

transmitting the two-dimensional barcode to the fog device;

receiving a key configured to lock or unlock a smart lock on the object from the fog device; and transmitting the key to the smart lock to lock or unlock the object.

14. The mobile device of claim 13, wherein the program code further instructs the processing unit to execute the following step:

obtain a two-dimensional barcode and a random code corresponding to the object;

transmit the two-dimensional barcode and the random code to the fog device;

receive a key used to lock or unlock a smart lock on the object from the fog device receive; and transmit the key to the smart lock to lock or unlock the object.

* * * * *